(12) United States Patent
Morassi et al.

(10) Patent No.: US 10,940,563 B2
(45) Date of Patent: Mar. 9, 2021

(54) SIMULTANEOUS LASER WELDING APPARATUS OF A VEHICLE LIGHT AND SIMULTANEOUS LASER WELDING METHOD OF A VEHICLE LIGHT

(71) Applicant: MARELLI AUTOMOTIVE LIGHTING ITALY S.P.A., Turin (IT)

(72) Inventors: Silvano Morassi, Turin (IT); Igor Di Vora, Turin (IT); Melchiade Agostini, Turin (IT); Domenico Ferigo, Turin (IT); Marco Valle, Turin (IT); Cristian Segalla, Turin (IT)

(73) Assignee: MARELLI AUTOMOTIVE LIGHTING ITALY S.P.A., Turin (IT)

( * ) Notice: Subject to any disclaimer, the term of this patent is extended or adjusted under 35 U.S.C. 154(b) by 135 days.

(21) Appl. No.: 15/951,357

(22) Filed: Apr. 12, 2018

(65) Prior Publication Data
US 2018/0297148 A1 Oct. 18, 2018

(30) Foreign Application Priority Data

Apr. 14, 2017 (IT) .................. 102017000041997

(51) Int. Cl.
*B23K 26/21* (2014.01)
*G02B 6/10* (2006.01)
(Continued)

(52) U.S. Cl.
CPC ............ *B23K 26/21* (2015.10); *B23K 26/704* (2015.10); *B29C 65/1635* (2013.01);
(Continued)

(58) Field of Classification Search
CPC .. B23K 26/21; B23K 26/0676; B23K 26/704; B29C 65/1667; B29C 66/542;
(Continued)

(56) References Cited

U.S. PATENT DOCUMENTS 8,295,671 B2* 10/2012 DeMeritt ........... G02B 6/02033
385/140
9,766,411 B2* 9/2017 Butler .................. G02B 6/3616
(Continued)

FOREIGN PATENT DOCUMENTS

CN 104985324 B 6/2016
EP 1477294 A1 * 11/2004 ....... B29C 66/82661
(Continued)

OTHER PUBLICATIONS

Machine translation of WO-2016063720-A1, Mar. 2020.*
Search Report for Italian Patent Application No. 201700041997 dated Jan. 29, 2018.

*Primary Examiner* — Geoffrey S Evans (74) *Attorney, Agent, or Firm* — Howard & Howard Attorneys PLLC (57) ABSTRACT

A simultaneous laser welding apparatus of a vehicle light comprising a placement support for a container body and a lenticular body of a vehicle light welded together at reciprocal perimeter profiles, a plurality of laser sources, a plurality of optical fibres associated with the laser sources at input ends for transmitting the light beams, a fibre-holder support device for blocking output ends of the optical fibres in predetermined positions, spaced apart by a pitch, a light guide provided with at least one seat which receives the light beams coming from the output ends of the optical fibres, to a light output wall which sends the light beams towards the welding interface. A single optical fibre is associated with each laser source.

17 Claims, 5 Drawing Sheets

(51) Int. Cl.
*B23K 26/70* (2014.01)
*G02B 6/04* (2006.01)
*B60Q 1/04* (2006.01)
*B29C 65/16* (2006.01)
*B29C 65/00* (2006.01)
*B29C 65/78* (2006.01)
*F21S 41/20* (2018.01)
*F21S 41/29* (2018.01)
*B29L 31/00* (2006.01)
*B29L 31/30* (2006.01)

(52) U.S. Cl.
CPC ...... *B29C 65/1667* (2013.01); *B29C 65/1687* (2013.01); *B29C 65/7841* (2013.01); *B29C 66/301* (2013.01); *B29C 66/542* (2013.01); *B60Q 1/0441* (2013.01); *G02B 6/04* (2013.01); *G02B 6/10* (2013.01); *B29C 65/167* (2013.01); *B29C 66/3472* (2013.01); *B29C 66/71* (2013.01); *B29C 66/9161* (2013.01); *B29L 2031/30* (2013.01); *B29L 2031/747* (2013.01); *F21S 41/28* (2018.01); *F21S 41/29* (2018.01)

(58) Field of Classification Search
CPC ............ B29C 65/1635; B29C 65/7841; B29C 66/301; B29C 65/1687; G02B 6/04; G02B 6/10; G02B 6/102; B60Q 1/0441
See application file for complete search history.

(56) References Cited

U.S. PATENT DOCUMENTS

| | | | |
|---|---|---|---|
| 2012/0061357 A1* | 3/2012 | Ramsayer | B23K 26/04 219/121.64 |
| 2015/0276158 A1* | 10/2015 | Boero | B29C 65/1687 362/506 |
| 2016/0121426 A1* | 5/2016 | Hollinger | B23K 26/364 425/174.4 |
| 2016/0348866 A1 | 12/2016 | Ferigo et al. | |
| 2017/0014948 A1 | 1/2017 | Guo et al. | |

FOREIGN PATENT DOCUMENTS

| | | | | |
|---|---|---|---|---|
| EP | 2923819 | A1 | 9/2015 | |
| EP | 2923820 | A1 | 9/2015 | |
| EP | 2949452 | A1 | 12/2015 | |
| EP | 2957418 | A1 | 12/2015 | |
| FR | 2952316 | A1 | 5/2011 | |
| WO | 2016063720 | A1 | 4/2016 | |
| WO | WO-2016063720 | A1 * | 4/2016 | ........... B23K 26/324 |

* cited by examiner

SIMULTANEOUS LASER WELDING APPARATUS OF A VEHICLE LIGHT AND SIMULTANEOUS LASER WELDING METHOD OF A VEHICLE LIGHT

CROSS-REFERENCE TO RELATED APPLICATIONS

The present application claims priority to and all the benefits of Italian Patent Application No. 102017000041997, filed on Apr. 14, 2017, which is hereby expressly incorporated herein by reference in its entirety.

BACKGROUND OF THE INVENTION

1. Field of the Invention

The present invention relates to a simultaneous laser welding apparatus of a vehicle light and a simultaneous laser welding method of a vehicle light.

2. Description of the Related Art

The term vehicle light indifferently refers to a rear vehicle light or a front vehicle light, the latter also called headlight or headlamp.

As is known, a vehicle light is a lighting and/or signaling device of a vehicle comprising at least one external vehicle light serving a function of illuminating and/or signaling towards the outside of a vehicle, such as for example a position light, a direction indicator light, a stop light, a rear fog light, a reversing light, a dipped-beam headlamp, a high-beam headlamp and the like.

In its simplest abstraction, the vehicle light comprises a container body, a lenticular body and at least one light source.

The lenticular body is arranged to close a mouth of the container body so as to form a housing chamber. The light source is arranged inside the housing chamber, which light source may be directed so as to emit light towards the lenticular body, when fed with electric power.

Once the different components are assembled, the method for making a vehicle light should include the fastening and airtight closing of the lenticular body on the container body.

Such a closing and fastening are usually performed by laser welding.

The laser welding techniques of the known solutions however are not free from drawbacks, since the laser welding processes of the lenticular bodies on the container body are rather complex, slow and therefore costly.

It is known to perform a simultaneous laser welding in which respective perimeter edges or profiles of the lenticular body and of the container body which are counter-shaped so as to interface each other, are initially placed in mutual contact, in assembled configuration of the vehicle light, at a welding interface. Therefore, the welding is performed simultaneously over the whole welding interface.

During the step of laser welding, the container body acts as absorbing element towards the light beam emitted by the laser source, while the lenticular body acts as transmitting element of the same light beam.

The lenticular body substantially transmits the laser beam therein incident without absorbing it, which laser beam reaches the welding interface. The laser beam is absorbed at the welding interface by the perimeter edge of the container body which is heated up to softening.

The softening, accompanied by a mutual nearing pressure between the bodies, causes the partial interpenetration between the profiles and therefore the creation of a welding seam on said welding interface.

As is understood, for the purposes of the quality and resistance of the welding seam, the energy affecting the whole interface is to be uniformly dosed.

To this end, simultaneous laser welding techniques are known in which a laser source (e.g. a laser diode) is connected to a bundle of optical fibres which serve the function of spreading the laser beam generated and directing it towards a plurality of points of the welding interface.

In particular, the optical fibres end in a light guide that distributes the light beams over said welding interface.

This solution is not free from drawbacks.

Indeed, firstly there is a need to use a laser diode with increased light power since it is to be divided between a plurality or a bundle of optical fibres which should conduct the laser beams over the welding interface with a sufficient power to obtain the softening of the perimeter edge of the container body.

The division of the light beam produced by a laser diode in an optical fibre bundle also results in significant losses of power (also in the order of 30%).

Moreover, the use of an optical fibre bundle does not allow the light power emitted by each fibre to be locally managed since the light power is divided into equal parts over each optical fibre of the bundle. Such a limitation of the conventional simultaneous laser welding apparatus is a problem in lights, especially due to the particular shapes of the lenticular body which would instead require the light power to be locally managed. In the case in point, the light power irradiated by each fibre of the bundle is always constant and is equal to the one of the worst case, i.e. it is equal to the power required to make the joint that the increased power delivery requires.

In other words, the maximum light power required by the most critical welding point is to be sent to all portions of the welding interface.

However, this expenditure of light power has negative repercussions on the tooling times and costs, which are very high.

SUMMARY OF THE INVENTION

It is therefore the object of the present invention to perform the welding of vehicle lights by use of a simultaneous laser welding apparatus and a related technique which may obviate the technical drawbacks associated with the solutions of the prior art.

Such an object is achieved by a simultaneous welding apparatus of a vehicle light comprising a placement support for supporting a container body and a lenticular body of a vehicle light welded together at reciprocal perimeter profiles joined at a welding interface, a plurality of laser sources suitable for emitting light beams, and a plurality of optical fibres, each extending from an input end to an output end. The optical fibres are associated with the plurality of laser sources and are suitable to transmit the light beams. A fibre-holder support device supports the optical fibres, and blocks in predetermined positions, spaced by a pitch, the output ends of the optical fibres directing the latter towards the welding interface. A single optical fibre is associated at its input end to each laser source so as to receive, channel and transmit towards the welding interface, the light beam produced by said corresponding laser source.

The present invention is also directed toward a method of simultaneous laser welding of an automotive headlight comprising the steps of providing a plurality of laser sources, each suitable to emit a light beam, providing a plurality of optical fibres, each optical fibre comprising an output end and an input end, associating a respective laser source to each optical fibre. The input end of an optical fibre is respectively connected to an output of a laser source. A fibre-holder support is provided to support the plurality of optical fibres. A placement support is provided and includes a container body delimited by a first perimeter profile. A lenticular body is provided and is delimited by a second perimetral profile. The first and second perimetral profile of the container body and of the lenticular body are at least partially counter-shaped to each other so as to interface at a welding interface. The method also includes the steps of attaching the container body and the lenticular body to the placement support, joining at least partially in contact with each other the respective first and second perimetral profiles of the container body and of the lenticular body, locking in the predetermined positions the output ends of the optical fibres in the fibre-holder support, and orienting the output ends towards the welding interface, and then performing a simultaneous laser welding between the lenticular body and the container body at the welding interface by activating the laser sources emitting light radiation transmitted by the lenticular body and absorbed by the container body.

BRIEF DESCRIPTION OF THE DRAWINGS

Further features and advantages of the present invention will become more comprehensible from the following description of preferred, non-limiting embodiments, in which.

The elements or parts of elements common to the embodiments described later will be indicated using the same reference numerals.

DETAILED DESCRIPTION OF THE INVENTION

Figure 1:
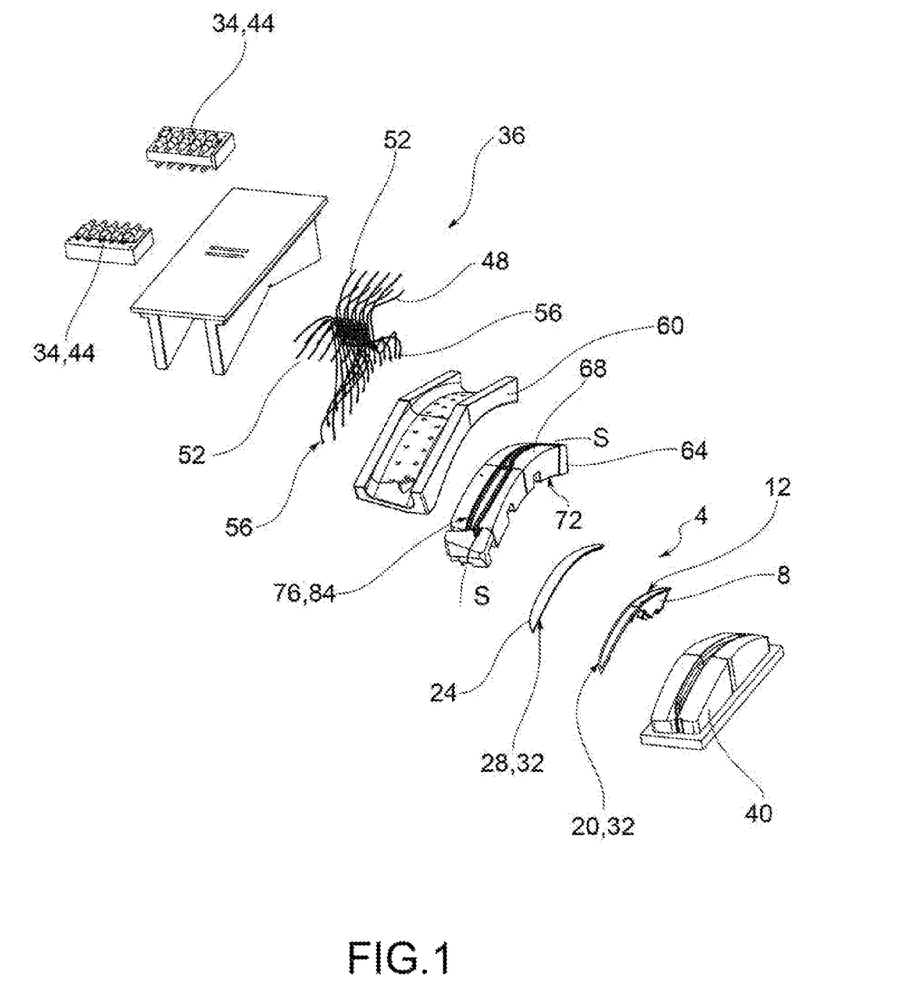
FIG. 1 depicts a perspective view of a welding apparatus of a vehicle light according to the present invention, in configuration with separate parts.
Figure 2:
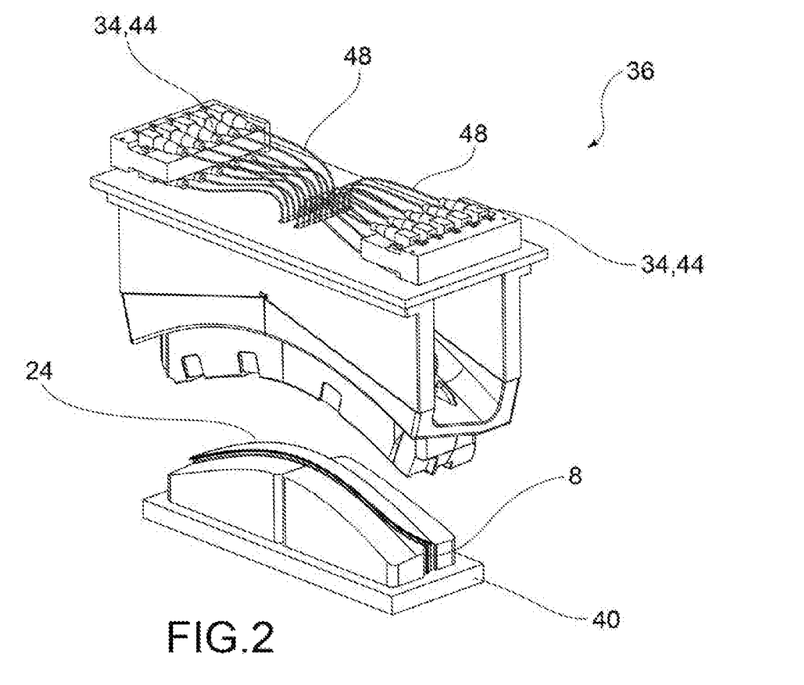
FIG. 2 depicts a perspective view of the apparatus in FIG. 1, in partially assembled configuration.
Figure 3:
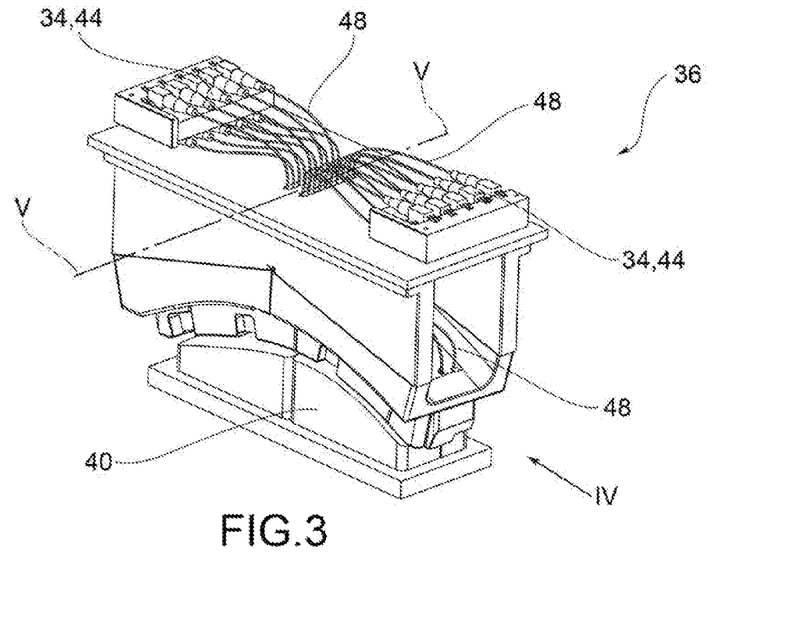
FIG. 3 depicts a perspective view of the welding apparatus in FIG. 1, in assembled configuration.
Figure 4:
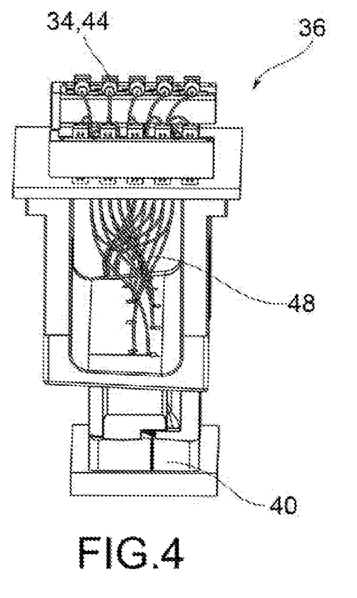
FIG. 4 depicts a side view of the apparatus in FIG. 3, on the side of the arrow IV in FIG. 3.
Figure 5:
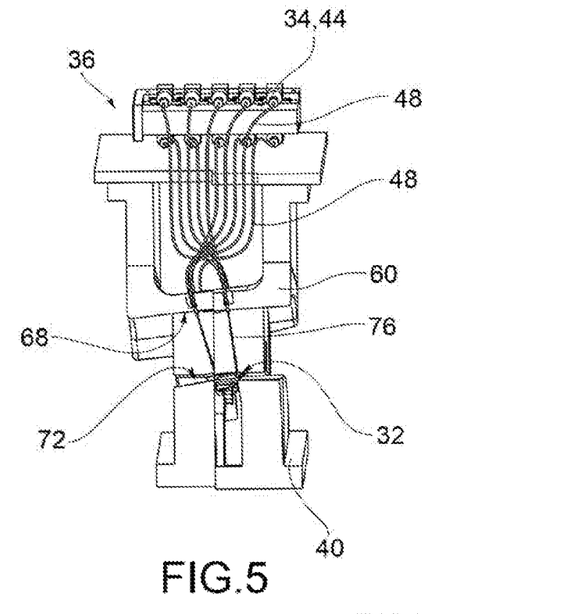
FIG. 5 depicts a sectional view of the apparatus in FIG. 3, along the cross-section plane V-V indicated in FIG. 3.
Figure 6:
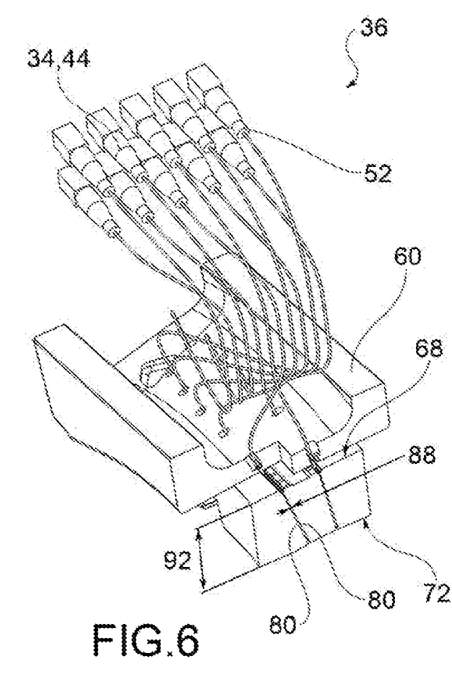
FIGS. 6 to 9 depict partial perspective views, from different angles, of components of the apparatus in FIG. 3.
Figure 7:
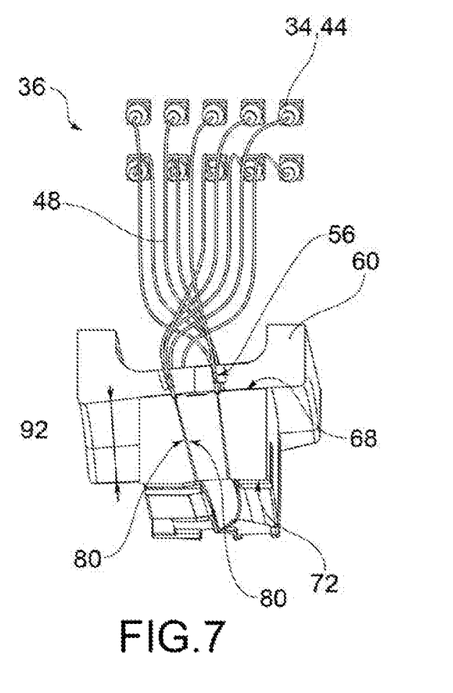
Figure 8:
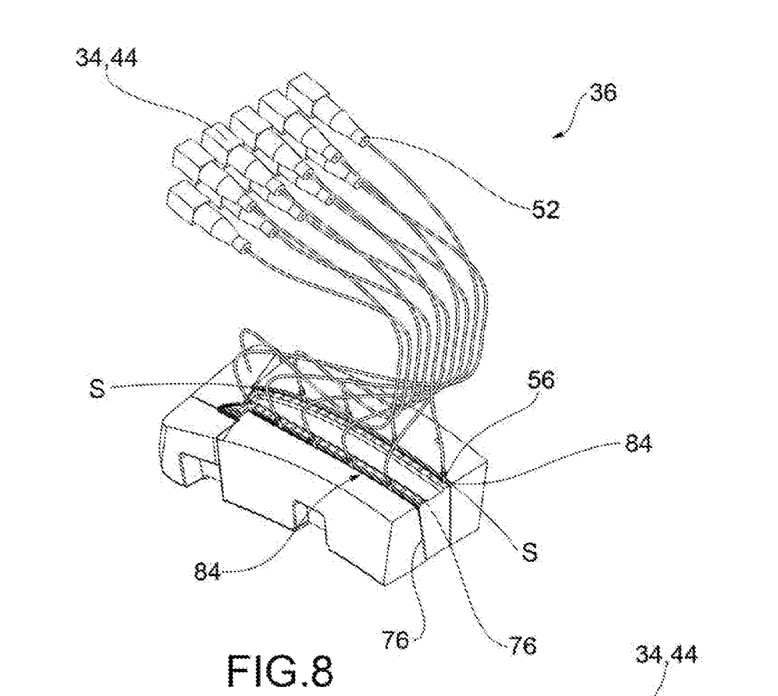
Figure 9:
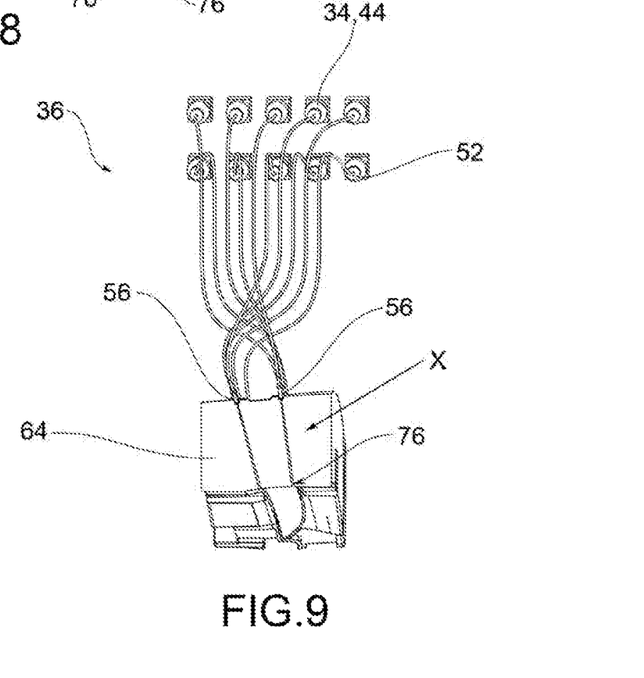
Figure 10:
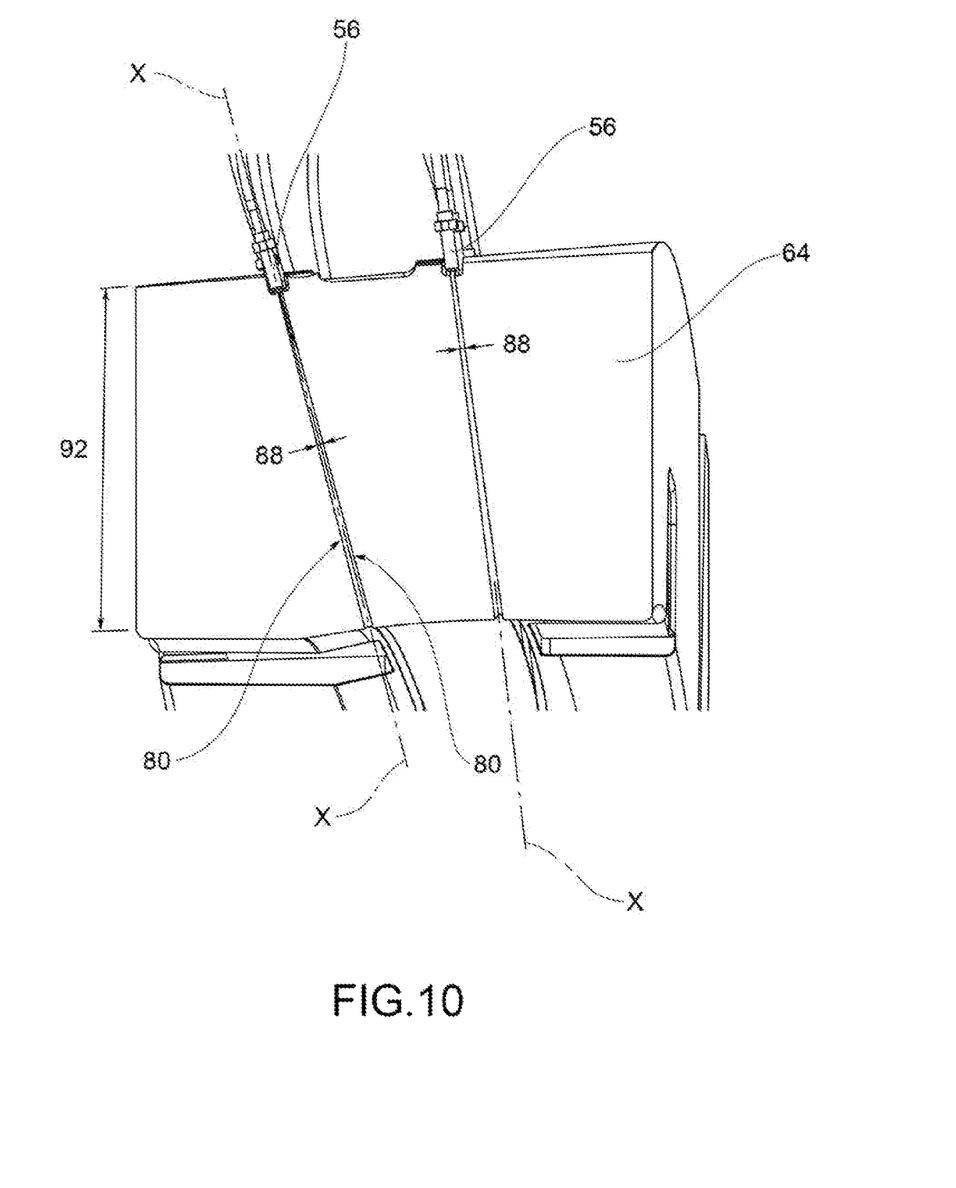
FIG. 10 depicts the enlarged detail X indicated in FIG. 9.

With reference to the aforesaid drawings, 4 indicates a vehicle light as a whole, to which the following disclosure refers without however being less general.

As indicated above, the term vehicle light indifferently refers to a rear vehicle light or a front vehicle light, the latter also called headlight or headlamp.

As is known, the vehicle light comprises at least one external vehicle light serving a function of illuminating and/or signaling, such as for example a position light, which may be a front, rear, side position light of a direction indicator light, a stop light, a rear fog light, a high-beam headlamp, a dipped-beam headlamp and the like.

The vehicle light 4 comprises a container body 8, usually made of polymeric material, which typically allows the fastening of the vehicle light 4 to the related vehicle.

For the purposes of the present invention, the container body 8 may have any shape and size, and also positioning: for example, the container body may not be directly associated with the body or other fastenings of the associated vehicle.

According to one embodiment, the container body 8 delimits a containment seat 12 which accommodates at least one light source (not depicted) electrically connected to an electrical connector for feeding it, and suitable for emitting a light beam to be propagated outside the vehicle light. For the purposes of the present invention, the type of light source used is irrelevant; for example, the light source is a light-emitting diode (LED) light source.

The container body 8 is delimited by a first perimeter profile 20.

A lenticular body 24, in turn delimited by a second perimeter profile 28, is associated with the container body 8.

The lenticular body 24 is applied on the container body 8 so as to close said containment seat 12 which accommodates at least one light source.

For the purposes of the present invention, the lenticular body 24 may be external to the vehicle light 4 so as to define at least one outer wall of the vehicle light directly subjected to the atmosphere.

The lenticular body 24 closes the containment seat 12 and is suitable for being crossed by the light beam produced by the light source, which is transmitted outside the containment seat 12.

To this end, the lenticular body 24 is made with at least partially transparent or semi-transparent or translucent material, it also being able to include one or more opaque portions, in any case so as to allow the at least partial crossing of the light beam produced by the light source.

According to possible embodiments, the material of the lenticular body 24 is a resin such as PMMA, PC and the like.

The first and second perimeter profile 20,28 of the container body 8 and of the lenticular body 24 are at least partially counter-shaped to each other so as to interface at a welding interface 32, in assembled configuration of the vehicle light 4.

As better described later, the welding seam is formed and the partial interpenetration between the perimeter profiles is obtained at the welding interface 32 following laser welding.

The assembly of the vehicle light 4 comprises the step of at least partially joining the respective first and second perimeter profiles (20, 28) with each other. For example, the step is provided of arranging the lenticular body 24 to close the containment seat 12 of the container body 8 so as to join the respective first and second perimeter profile 20, 28.

The method of making the vehicle light provides joining the lenticular body 24 and the container body 8 at said perimeter profiles 20, 28 via simultaneous laser welding.

The welding of the lenticular body 24 on the container body 8 is a simultaneous laser type welding, in which the light beam emitted by a laser source 34 is directed towards the perimeter profiles 20, 28 so as to reach the first perimeter profile 20 of the container body 8 upon crossing of the lenticular body 24.

During the step of simultaneous laser welding, the container body 8 acts as absorbing element towards the light beam emitted by the laser source 34 and the lenticular body 24 acts as transmitting element of the same light beam.

The welding occurs by using a specific simultaneous laser welding apparatus 36, which is particularly suitable for welding a vehicle light 4 in which there is provided to simultaneously weld together the lenticular body 24 and the container body 8.

Such a simultaneous laser welding apparatus 4 of a vehicle light of the present invention comprises a placement support 40 for supporting the container body 8 and the lenticular body 24 of the vehicle light 4 to be welded together at reciprocal first and second perimeter profiles 20, 28 joined at the welding interface 32.

The apparatus 36 further comprises a plurality of laser sources 34, preferably a plurality of laser diodes 44 suitable for emitting light beams.

According to possible further embodiments, the laser source 34 is not limited to a laser diode but may comprise a $CO_2$ laser source, in which the laser beam is produced by a gas mixture comprising $CO_2$, or a YAG laser, in which the laser beam is produced by a solid-state crystal, or further types of laser sources.

The welding apparatus 36 further comprises a plurality of optical fibres 48 associated with the laser sources 34 at input ends 52 of the optical fibres 48 and suitable for transmitting the light beams produced by the laser sources 34.

The optical fibres 48 transmit, in known manner, by total internal reflection, the light beams entered through the input ends 52 thereof up to the output ends 56 thereof.

The apparatus 36 comprises a fibre-holder support device 60 for supporting the output ends 56 of the optical fibres 48, suitable for blocking the output ends 56 of said optical fibres 48 in predetermined positions, spaced by a pitch P, so as to arrange the optical fibres along the whole welding interface 32 and to orient them towards said welding interface 32.

Moreover, according to one embodiment, apparatus 36 comprises a light guide 64 fastened to the fibre-holder support device 60.

Moreover, the light guide 64 is shaped to receive the light beams emitted from the output ends 56 of the optical fibres 48 at a light input wall 68, and to send them through a light output wall 72 thereof towards the welding interface 32.

Advantageously, a single optical fibre 48 is associated at its input end 52 with each laser source 34,44 so as to receive, channel and transmit the light beam produced by said corresponding laser source 34, 44 towards the welding interface 32.

In other words, each optical fibre 48 is associated at its input end 52 with a single respective laser source 34, 44 so as to receive, channel and transmit the light beam produced by said corresponding laser source 34, 44 towards the welding interface 32.

Therefore, a single corresponding optical fibre 48 is associated with each light source 34, 44.

In one embodiment, the light guide 64 is a negative light guide, i.e. comprising a plurality of hollow seats 76 delimited by pairs of side walls 80 arranged symmetrically with respect to an optical axis X-X of the light beam emitted by each optical fibre 48.

In other words, the optical fibres 48 emit a light beam having a main optical axis X-X arranged symmetrically in the seats 76 of the light guide 64.

In one embodiment, the light guide 64 is connected in cascade to the fibre-holder support device 60, in which each output end 56 of each optical fibre 48 blocked in said fibre-holder support device 60 is placed adjacent to the light input wall 68 of the light guide 64 so as to overlook said hollow seat 76 of the light guide 64.

In one embodiment, the seats 76 of the light guide 64 delimit a continuous perimetral contour 84, counter-shaped to said welding interface 32.

Thus, the perimetral contour 84 is a closed contour that extends along a closed polyline, which follows the profile of the welding interface 32.

The polyline may consist of an assembly of rectilinear and/or curved segments connected to one another in a continuous manner to form a closed profile.

In one embodiment, the side walls 80 are flat and parallel to each other with respect to a cross-section plane T perpendicular to a curved abscissa S defining said perimetral contour 84.

According to a further embodiment, the side walls 80 are flat and divergent from each other at the output end 56 of each optical fibre 48 with respect to a cross-section plane T perpendicular to a curved abscissa S defining said perimetral contour 84.

In other words, the side walls 80 diverge, moving from the light input wall 68 to the light output wall 72.

For example, said flat and divergent side walls 80 diverge by a vertex angle of at least 1 degree.

Such an angle preferably is between 1 and 3 degrees.

In one embodiment, the thickness of the individual optical fibres 48 is between 100 and 200 microns.

Such a thickness is substantially equal to a width 88 of seat 76 of the light guide 64, in which width 88 is defined as the distance between a pair of side walls 80 of the light guide 64 with respect to a cross-section plane T perpendicular to a curved abscissa S defining said perimetral interface 32.

It is also possible to define a depth 92 of seat 76 of the light guide 64, defined as the distance between the light input wall 68 and the light output wall 72 of the light guide 64, parallel to said optical axis X-X.

In one embodiment, according to the present invention, the ratio between depth 92 and width 88 of the light guide 64 is between 50 and 100.

With regard to pitch P between the output ends 56 of the optical fibres 48, preferably the latter are spaced apart from each other by a pitch P between 10 and 18 mm.

Even more preferably, the output ends 56 of the optical fibres 48 are spaced apart from each other by a pitch P between 13 and 15 mm.

It is worth noting that such a pitch may be highly variable according to several factors, such as for example the materials of the lenticular body 24 and of the container body 8, the geometry or thickness of the lenticular body 24 and the geometrical shape of the welding interface 32.

Moreover, pitch P may vary along the extension of the welding interface 32 according to, for example, the geometry of the lenticular body 24 and of the container body 8.

According to a possible embodiment of the present invention, the optical fibres 48 comprise, at the respective output ends 56, optics (not depicted), for example of the pillow type, suitable for expanding the light beam along a direction substantially parallel to the curved abscissa S defining said welding interface 32 so as to mix the light beam between the side walls 80 of the light guide 64 more effectively.

Moreover, partial overlapping of side portions of light beams coming from laser sources placed side-by-side and incident on contiguous portions of the welding interface, may be obtained.

Such a partial overlapping facilitates the uniformity of the welding seam that may be obtained on the welding interface 32.

The welding method of a vehicle light according to the present invention is now described. In particular, the welding method of a vehicle light according to the present invention comprises the steps of: arranging a welding apparatus 36 in which each optical fibre 48 is connected at its output to a single respective laser source 34,44 so as to receive, channel and transmit the light beam produced by said corresponding laser source 34,44 towards the welding interface 32, providing a container body 8 delimited by a first perimeter profile 20, providing a lenticular body 24 delimited by a second perimeter profile 28, in which the first and second perimeter profile 20,28 of the container body 8 and of the lenticular body 24 are at least partially counter-shaped to each other so as to interface at a welding interface 32, attaching the container body 8 and the lenticular body 24 to the placement support 40, joining the respective first and second perimeter profiles 20,28 of the container body 8 and of the lenticular body 24 at least partially in contact with each other, associating the light guide 64 so as to bring the light output wall 72 in position facing the lenticular body 24, performing a welding between the lenticular body 24 and the container body 8 at the welding interface 32 by activating laser sources 34 that emit light radiation transmitted by the lenticular body 24 and absorbed by the container body 8.

Such a method may also comprise the steps of differentiating the energy produced by the laser sources 34 spread along the welding interface 32.

The turning on of at least two laser sources 34 spread along the welding interface 32 may also be temporally staggered.

As may be noted from what has been described, the present invention allows the drawbacks presented in the known art to be overcome.

In particular, the simultaneous laser welding technique may be applied in a quick and affordable manner also to vehicle lights having any type of complex geometry, also with highly variable curves and thicknesses along the perimeter of the light.

In particular, due to the use of laser diodes each provided with its own and only optical fibre, the incident power on each portion of the welding interface may be individually and punctually adjusted, thus adapting it to the specificities of the geometry of the interface, and also of the lenticular body which is to be crossed by the light beam emitted.

Thereby, the light power required to make a mechanically resistant and long-lasting welding joint may be obtained.

Moreover, losses of power are drastically reduced to about 1 to 2% with respect to losses in the order of 30 to 35% with the optical fibre bundles of the solutions of the prior art.

Moreover, the optical power may be controlled locally at the outlet of each fibre and, from this, at the inlet of the lenticular body up to the welding interface.

Indeed, in the known solutions which use fibre bundles connected to the same LED source, the lengths of the fibres may be highly variable between one another: for example, the fibres arranged in middle position with respect to the laser diode are shorter with respect to the ones arranged in side or decentralized positions with respect to said diode. Highly variable lengths between one another distribute an outlet power which in turn is uneven. In the solutions of the known art, there is no way to control this parameter since the power distributed by the individual LED should feed several optical fibres.

Instead, by virtue of the present invention, each laser diode may be calibrated with a specific optical fibre thereof, considering the length of the optical fibre, the power of the individual laser source and also the trajectory that the light beam should perform to reach a given area of the welding interface.

Therefore, by virtue of the present invention, the light beam that affects the interface is perfectly calibrated to obtain a welding joint having excellent mechanical qualities, without wastes of light power.

Moreover, the welding apparatus according to the invention, as shown, comprises a light guide which is fed by laser beams coming from the individual fibres. In the specific case, individual fibres are used therefore having very small cross section, which allow a light guide to be used having relatively long and narrow walls, to the benefit of an improved homogenizing of the laser beam.

The individual optical fibres according to the present invention have a thickness of about 100 to 200 microns, while the optical fibres of a bundle used in the solutions of the prior art have a thickness of about 2 mm. Such a thickness of the optical fibre defines the width of the light guide which substantially receives said fibres without clearance.

This means that the light guide of the present invention has a depth—i.e. the distance between the inlet wall and the outlet wall of the light guide—comprised between 50 and 100 times the width of the light guide, while the ratio between the depth and the width of the light guide in the known solutions is about equal to 10.

From a technical point of view, it has been verified that the increase of such a depth/width ratio of the light guide allows an improved mixing and spreading of the light beams arriving on the welding interface, to be obtained.

Moreover, the optical fibres are significantly spaced apart with respect to an equivalent bundle architecture of the prior art, and therefore they are fewer in number to cover a same perimeter of welding interface.

In other words, the pitch between adjacent fibres may be increased with respect to the solutions of the known art, and therefore the overall costs of the welding apparatus may be reduced.

As indeed is shown, it is possible to go from the current pitch or distance between optical fibres equal to 3 to 4 mm, up to a pitch equal to 13 to 18 mm: in other words, the pitch substantially is quadruplicated with respect to the known solutions with optical fibre bundle. This means that the overall number of optical fibres to use in the apparatus may be reduced to at least one fourth, extension of the welding interface being equal.

Moreover, the reduction of the number of optical fibres allows a significant reduction of the losses of power both because the overall number of optical fibres is reduced and because laser diodes having reduced powers may be used because each laser diode should feed only one optical fibre.

Moreover, the length of the optical fibres may be significantly shortened because, since a single optical fibre is to be fed, the laser diode may be positioned directly close to the portion of welding interface to be softened.

Therefore, by virtue of the present invention, optical fibres may be used having reduced lengths with respect to the solutions of the prior art with optical fibre bundles.

A lower average length further allows the losses and also the powers of the laser diodes used, to be reduced.

Moreover, the replacement of a fibre bundle associated with a laser source, with a single fibre associated with a respective laser source, allows the whole light beam emitted by the single laser source to be channeled into the optical fibre.

Instead, adjacent optical fibre bundles defining empty spaces are used in the solutions of the prior art; therefore, in the known solutions in which an optical fibre bundle is associated with a single laser source, part of the light beam emitted thereby inevitably is scattered in said empty interspaces defined between adjacent optical fibres, without entering the optical fibres forming the bundle itself. Such portions of light beams that enter said interspaces form losses of light power which instead are eliminated in the solution of the present invention.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A simultaneous laser welding apparatus of a vehicle light comprising:
   a placement support for supporting a container body and a lenticular body of a vehicle light welded together at reciprocal perimeter profiles joined at a welding interface,
   a plurality of laser sources suitable for emitting light beams,
   a plurality of optical fibers, each extending from an input end to an output end, the optical fibers being associated with said plurality of laser sources and being suitable to transmit said light beams,
   a fiber-holder support device for supporting the optical fibers, suitable to block in predetermined positions, spaced by a pitch, said output ends of the optical fibers directing the latter towards said welding interface,
   wherein a single optical fiber is associated at its input end to each laser source so as to receive, channel and transmit towards the welding interface, the light beam produced by said corresponding laser source,
   wherein the apparatus comprising a light guide is provided with at least one hollow seat extending from a light input wall, which receives the light beams coming from the output ends of the optical fibers to a light output wall which sends the light beams towards the welding interface.

2. The simultaneous laser welding apparatus of a vehicle light as set forth in claim 1, wherein said laser sources comprise laser diodes.

3. The simultaneous laser welding apparatus of a vehicle light claim 1, wherein the light guide is a negative light guide comprising a plurality of hollow seats delimited by pairs of side walls arranged symmetrically with respect to an optical axis of the light beam emitted by each optical fiber.

4. The simultaneous laser welding apparatus of a vehicle light claim 1, wherein the seats of the light guide delimit a continuous perimetral contour, counter-shaped to said welding interface.

5. The simultaneous laser welding apparatus of a vehicle light as set forth in claim 4, wherein said side walls are flat and parallel to each other with respect to a cross-section plane perpendicular to a curved abscissa defining said perimetral contour.

6. The simultaneous laser welding apparatus of a vehicle light as set forth in claim 4, wherein said side walls are flat and divergent from each other at the output end of each optical fiber with respect to a cross-section plane perpendicular to a curved abscissa defining said perimetral contour.

7. The simultaneous laser welding apparatus of a vehicle light as set forth in claim 6, wherein said flat and divergent side walls diverge by a vertex angle of at least 1 degree.

8. The simultaneous laser welding apparatus of a vehicle light as set forth in claim 1, wherein the light guide is connected in cascade to the fiber-holder support device, wherein each output end of each optical fiber blocked in said fiber-holder support device is placed adjacent to the light input wall of the light guide so as to be overlooking said hollow seat of the light guide.

9. The simultaneous laser welding apparatus of a vehicle light as set forth in claim 1, wherein the ratio between a depth and a width of the light guide is between 50 and 100, wherein the depth is the distance between the light input wall and the light output wall of the light guide, and the width is the distance between a pair of side walls of the light guide with respect to a cross-section plane perpendicular to a curved abscissa defining said perimetral contour.

10. The simultaneous laser welding apparatus of a vehicle light as set forth in claim 1, wherein a thickness of the individual optical fibers is between 100 and 200 microns.

11. The simultaneous laser welding apparatus of a vehicle light as set forth in claim 1, wherein the output ends of the optical fibers are spaced apart from each other by a pitch between 10 and 18 mm.

12. The simultaneous laser welding apparatus of a vehicle light as set forth in claim 1, wherein the output ends of the optical fibers are spaced apart from each other by a pitch between 13 and 15 mm.

13. The simultaneous laser welding apparatus of a vehicle light as set forth in claim 1, wherein the optical fibers at respective output ends comprise optics suitable to expand the light beam in a direction substantially parallel to a curved abscissa defining said perimetral contour.

14. A method of simultaneous laser welding of an automotive headlight comprising the steps of:
   providing a plurality of laser sources, each suitable to emit a light beam,
   providing a plurality of optical fibers, each optical fiber comprising an output end and an input end,
   associating a respective laser source to each optical fiber, the input end of an optical fiber being respectively connected to an output of a laser source,
   providing a fiber-holder support to support the plurality of optical fibers,
   providing a placement support,
   providing a container body delimited by a first perimeter profile,
   providing a lenticular body delimited by a second perimetral profile,
   wherein the first and second perimetral profile of the container body and of the lenticular body are at least partially counter-shaped to each other so as to interface at a welding interface,
   attaching the container body and the lenticular body to the placement support,
   joining at least partially in contact with each other the respective first and second perimeter profiles of the container body and of the lenticular body,
   locking in said predetermined positions said output ends of the optical fibers in the fiber-holder support, orienting said output ends towards said welding interface,
   performing a simultaneous laser welding between the lenticular body and the container body at the welding interface by activating the laser sources emitting light radiation transmitted by the lenticular body and absorbed by the container body,
   providing a light guide in cascade to the fiber-holder support device, said light guide being provided with at least one seat defining a perimeter contour counter-shaped with respect to said welding interface and housing the output ends of the optical fibers blocked in said fiber-holder support.

15. The simultaneous laser welding method of a vehicle light as set forth in claim 14, comprising the step of differentiating the energy produced by the laser sources spread along the welding interface.

16. The simultaneous laser welding method of a vehicle light as set forth in claim 14, comprising the steps of temporally staggering the turning on of at least two laser sources spread along the welding interface.

17. The simultaneous laser welding method of a vehicle light as set forth in claim 14, wherein the welding equipment has a lenticular body of a vehicle light welded together at reciprocal perimeter profiles joined at a welding interface, the optical fibers being associated with said plurality of laser sources and being suitable to transmit said light beams, the fiber-holder support acting to block in predetermined positions, spaced by a pitch, the output ends of the optical fibers directing the latter towards the welding interface, wherein a single optical fiber is associated at its input end to each laser source so as to receive, channel and transmit towards the welding interface, the light beam produced by said corresponding laser source, said method further including the step of providing a simultaneous laser welding equipment and performing laser welding of a vehicle light by said laser welding equipment.

* * * * *